INVENTOR.
William H. Leinweber

Jan. 7, 1936. W. H. LEINWEBER 2,026,689
BLOWER
Filed Oct. 8, 1934 2 Sheets-Sheet 2

INVENTOR.
William H. Leinweber
BY
Threedy and Gannon
HIS ATTORNEYS.

Witness: L. M. Hansen

Patented Jan. 7, 1936

2,026,689

UNITED STATES PATENT OFFICE 2,026,689

BLOWER

William H. Leinweber, Chicago, Ill.

Application October 8, 1934, Serial No. 747,315

6 Claims. (Cl. 170—170)

This invention relates to blowers.

It is an object of this invention to provide an improved blower which is relatively simple and inexpensive in construction and efficient in use.

Another object of the present invention is to provide a blower, particularly adapted for use in conjunction with air-ventilating and air-conditioning apparatus, or other apparatus where a blower may be used, such as in conjunction with oil burners, or other fuel-burning apparatus requiring an air supply, and the like, and so constructed that it will circulate a greater volume of air at a higher velocity and more effectively than blowers heretofore made, in the same length of time and under similar conditions.

Other objects will appear hereinafter.

The invention consists in the novel combination and arrangement of parts to be hereinafter described and claimed.

The invention will best be understood by reference to the accompanying drawings, showing the preferred form of construction and in which.

Figure 1:
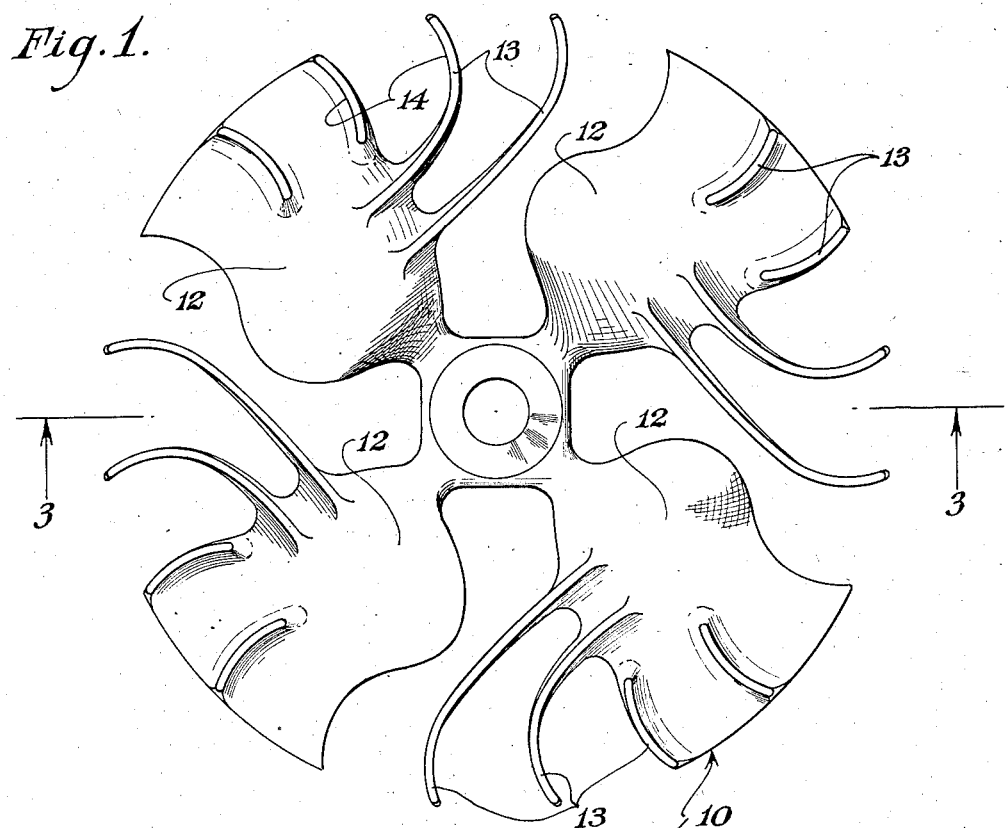
Fig. 1 is a front end elevational view of a preferred form of the new blower.
Figure 2:
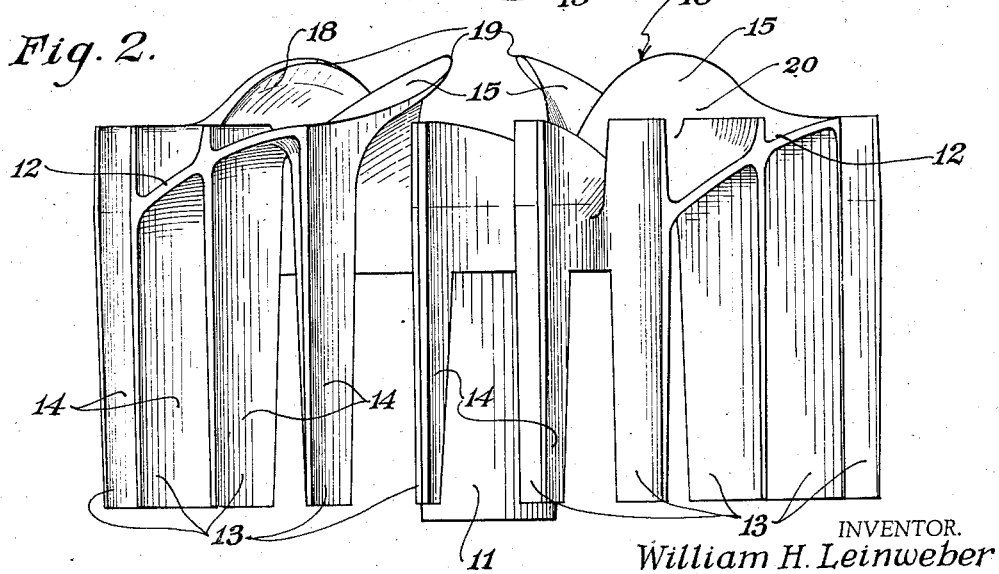
Fig. 2 is a side elevational view of the same.
Figure 3:
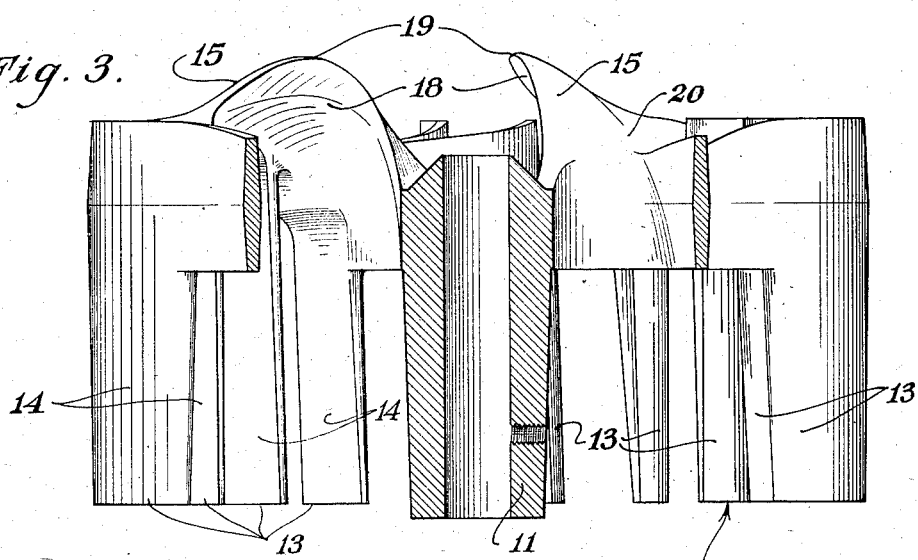
Fig. 3 is a sectional view on line 3—3 of Fig. 1.

A preferred form of the new blower is illustrated in the drawings and comprises a body 10 which includes a hub 11 by means of which the blower may be mounted upon a supporting shaft or the like for rotation thereby.

Figure 4:
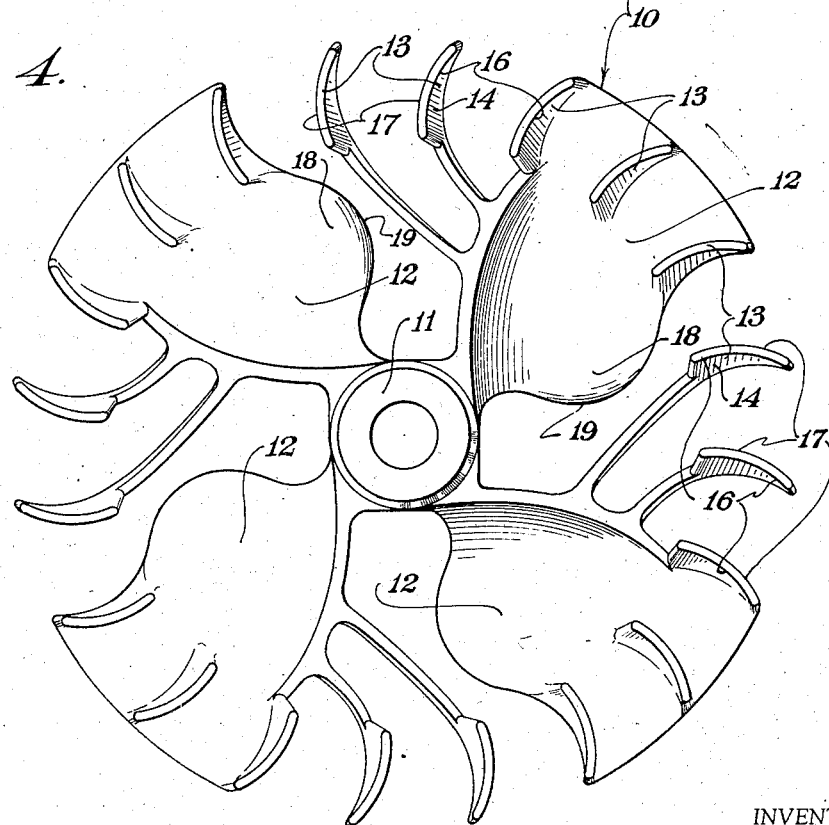
Fig. 4 is an end elevation of the blower shown in Figs. 1 to 3, inclusive, as seen from the side opposite that shown in Fig. 1.

Extending from the hub 11 at predetermined radial intervals therearound are arms 12, each of which is provided with a plurality of vanes 13. The vanes 13 extend parallel to the axis of the hub 11 and have a concave curvature (Fig. 1) on one side or face 14 thereof; these concave sides or faces 14 of the vanes 13 facing the leading edges 16 of the vanes 13 (Fig. 1), that is, facing in the direction in which the blower is rotated when in use (counterclockwise, Fig. 1; clockwise, Fig. 4), and facing away from the trailing edges 17 of the vanes 13.

Formed upon one axial end of each of the arms 12 of the blower is an impeller blade or cup 15, these impeller blades or cups 15 preferably being formed as integral extensions of the arms 12. Each of the impeller blades 15 has a concave curvature or face 18, these concave curvatures or faces 18 of the impeller blades 15 extending between the leading edges 19 and the trailing edges 20 of the impeller blades 15 and facing in the general direction in which the blower is rotated when in use (counterclockwise, Fig. 1; clockwise, Fig. 4).

The new blower is particularly adapted for use in conjunction with air-ventilating and air-conditioning apparatus and when rotated (counterclockwise, Fig. 1; clockwise, Fig. 4), in use, the impeller blades 15 exert a drag upon the air or other like fluid medium in which the blower may be rotated, thereby forcing a relatively large volume of air at relatively high velocity centrally into the body of the blower between the arms 12 thereof, and the air thus forced into the body of the blower is picked up by the concave faces 14 of the parallel vanes 13 and is deflected away from the blower tangentially relative to the peripheral surface or circumference of the blower, relative to the axes of the hub 11 and the vanes 13.

By reason of the foregoing construction of the new blower a larger volume of air is more effectively circulated and in less time than is possible in the conventional type or prior art blowers heretofore used, and in the present blower this is made possible particularly by reason of the impeller blades 15.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. An air blower comprising a body including a hub and a plurality of arms each including a plurality of vanes radially arranged about and integral with said hub and the axes of said vanes extending substantially parallel relative to each other and to the axis of said hub; each of said arms including an annular row of impeller blades, an air impeller or fan blade and said fan blade being radially arranged about said hub and providing an air fan at one axial end of the latter.

2. An air blower comprising a body including a hub and a plurality of arms each including a plurality of vanes radially arranged about and integral with said hub and the axes of said vanes extending substantially parallel to each other and to the axis of said hub; each of said arms including a row of impeller blades, an air impeller blade or cup and said impeller blades or cups being radially arranged relative to said hub and spaced radially therefrom at one axial end of said body so as to impel air between said vanes when the said blower is in use.

3. As air blower comprising a body including a hub and a plurality of arms radially arranged about and integral with said hub; each of said arms including a plurality of vanes integral therewith and the axes of said vanes extending substantially parallel relative to each other and to the axis of said hub; said body including a row of impeller blades radially arranged about said hub at one axial end thereof so as to impel air between said vanes when the blower is in use.

4. A blower comprising a body including a hub and a plurality of arms radially arranged about said hub; each of said arms including a plurality of vanes and the axes of said vanes extending substantially parallel relative to each other and to the axis of said hub; said body including a row of impeller blades radially arranged about said hub at one axial end thereof so as to impel air between said vanes when the blower is in use; each of said vanes having a concave face or curvature between its leading edge and its trailing edge and each of said impeller blades having a concave face or curvature between its leading edge and its trailing edge.

5. An air blower comprising a body including a hub and a plurality of arms radially arranged about said hub and integral therewith; each of said arms including a plurality of vanes formed integrally therewith on its trailing edge and the axes of said vanes extending substantially parallel relative to each other and to the axis of said hub, and being substantially co-extensive with the latter; each of said arms including a portion formed integrally therewith at one axial end thereof providing an air impeller or fan blade; said air impeller or fan blades providing in effect, an air fan at one axial end of said body whereby when said blower is in use air will be directed by the said fan blades between the said vanes and will be directed by the latter tangentially from the radially outer ends of the latter.

6. An air blower comprising a body including a hub and a plurality of arms radially arranged about and integral with said hub; each of said arms including a plurality of blower vanes extending substantially parallel relative to each other and to the axis of said hub; each of said arms having an air fan or impeller blade formed integrally therewith at an axial end thereof and said impeller or fan blades providing, in effect, an air fan at one axial end of said blower body for directing air between said vanes when the blower is in operation and the air being deflected by said vanes tangentially from the radially outer ends of the latter.

WILLIAM H. LEINWEBER.